(12) United States Patent
Alothman et al.

(10) Patent No.: US 11,973,785 B1
(45) Date of Patent: Apr. 30, 2024

(54) TWO-TIER CYBERSECURITY METHOD

(71) Applicant: KING FAISAL UNIVERSITY, Al-Ahsa (SA)

(72) Inventors: Abdulaziz Fahad Saad Alothman, Al-Ahsa (SA); Abdul Rahaman Wahab Sait, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/211,439

(22) Filed: Jun. 19, 2023

(51) Int. Cl.
H04L 29/06 (2006.01)
H04L 9/40 (2022.01)

(52) U.S. Cl.
CPC ...... H04L 63/1425 (2013.01); H04L 63/1416 (2013.01)

(58) Field of Classification Search
CPC .................. H04L 63/1425; H04L 63/1416
See application file for complete search history.

(56) References Cited

U.S. PATENT DOCUMENTS

| | | | |
|---|---|---|---|
| 7,359,962 B2 * | 4/2008 | Willebeek-LeMair | H04L 63/1416 709/224 |
| 10,540,578 B2 | 1/2020 | Madani et al. | |
| 10,713,821 B1 | 7/2020 | Surya et al. | |
| 11,297,084 B2 | 4/2022 | Huang et al. | |
| 11,487,969 B2 | 11/2022 | Huth et al. | |
| 11,588,621 B2 | 2/2023 | Angel et al. | |
| 11,663,364 B2 | 5/2023 | Wang | |
| 2005/0278777 A1 * | 12/2005 | Loza | H04L 63/1433 726/4 |
| 2017/0279834 A1 * | 9/2017 | Vasseur | H04L 43/024 |
| 2019/0042745 A1 | 2/2019 | Chen et al. | |
| 2021/0256309 A1 * | 8/2021 | Huth | G06F 18/2148 |

(Continued)

FOREIGN PATENT DOCUMENTS

| | | | |
|---|---|---|---|
| IN | 201941045886 A | 11/2019 | |
| WO | 2022052476 A1 | 3/2022 | |
| WO | WO-2022223940 A1 * | 10/2022 | ........... G06N 3/0454 |

OTHER PUBLICATIONS

Falana, Olorunjube James, et al. "Mal-Detect: An intelligent visualization approach for malware detection." Journal of King Saud University-Computer and Information Sciences 34.5 (2022): 1968-1983. (Year: 2022).*

(Continued)

*Primary Examiner* — Ka Shan Choy
(74) *Attorney, Agent, or Firm* — Nath, Goldberg & Meyer; Richard C. Litman

(57) ABSTRACT

The two-tier cybersecurity method applies malware detection to a network. The malware detection is based on a generative adversarial network (GAN). Additionally, each user accesses the network through a privacy-preserving interface which applies a federated learning-based data-sharing model. Known malicious and known benign files are converted into corresponding images, and these corresponding images are used as input sample data for the generative adversarial network for generating a class vector for classifying and identifying malware. A malware detector uses the class vector output by the GAN for malware identification. Additionally, a privacy-preserving interface is established for each user of the network. The privacy-preserving interface is a federated learning-based data-sharing model.

1 Claim, 2 Drawing Sheets

(56) References Cited

U.S. PATENT DOCUMENTS

| | | | |
|---|---|---|---|
| 2021/0303927 A1 | 9/2021 | Li et al. | |
| 2022/0100855 A1* | 3/2022 | Kumar | G06F 21/51 |
| 2022/0171873 A1 | 6/2022 | Lundbaek | |
| 2022/0269904 A1 | 8/2022 | Agarwal et al. | |
| 2022/0335275 A1 | 10/2022 | Tewari et al. | |
| 2023/0034303 A1 | 2/2023 | Korge et al. | |
| 2023/0041015 A1* | 2/2023 | Chhibber | G06N 20/00 |
| 2023/0056706 A1* | 2/2023 | Irving | H04L 9/0894 |
| 2023/0073235 A1 | 3/2023 | Wang | |
| 2023/0153461 A1* | 5/2023 | Kalra | G06F 21/6245 726/27 |

OTHER PUBLICATIONS

Kim, Jin-Young, et al. "Malware detection using deep transferred generative adversarial networks." Neural Information Processing: 24th International Conference, ICONIP 2017, Guangzhou, China, Nov. 14-18, 2017, Proceedings, Part I 24. Springer International Publishing, 2017.

Falana, Olorunjube James, et al. "Mal-Detect: An intelligent visualization approach for malware detection." Journal of King Saud University-Computer and Information Sciences 34.5 (2022): 1968-1983.

Miao, Qinyang, et al. "Federated deep reinforcement learning based secure data sharing for Internet of Things." Computer Networks 197 (2021): 108327.

\* cited by examiner

TWO-TIER CYBERSECURITY METHOD

BACKGROUND OF THE INVENTION

Field of the Invention

The disclosure of the present patent application relates to network security, and particularly to the combined detection of malware and the preservation of user privacy during data-sharing on a network.

Description of Related Art

A fast region based generative adversarial network (GAN) is a deep-learning-based generative model which involves two sub-models: a generator model for generating new examples and a discriminator model for classifying whether generated examples are real, from the domain, or fake, generated by the generator model. It requires less samples to learn an environment. Generative adversarial networks are based on a game theoretic scenario in which the generator network must compete against an adversary. The generator network directly produces samples. Its adversary, the discriminator network, attempts to distinguish between samples drawn from the training data and samples drawn from the generator.

The generator model takes a fixed-length random vector as input and generates a sample in the domain. The vector is drawn randomly from a Gaussian distribution, and the vector is used to seed the generative process. After training, points in this multidimensional vector space will correspond to points in the problem domain, forming a compressed representation of the data distribution. This vector space is referred to as a "latent space", or a vector space comprised of latent variables. Latent variables, or hidden variables, are those variables which are important for a domain but are not directly observable. In GANs, the generator model applies meaning to points in a chosen latent space, such that new points drawn from the latent space can be provided to the generator model as input and used to generate new and different output examples. After training, the generator model is kept and used to generate new samples.

The discriminator model takes an example from the domain as input (real or generated) and predicts a binary class label of real or fake (generated). The real example comes from the training dataset. The generated examples are output by the generator model. The discriminator is a normal (and well understood) classification model. After the training process, the discriminator model is typically discarded since the generator is of primary interest.

Generative modeling is an unsupervised learning problem; however, in the GAN architecture, the training of the generative model is framed as a supervised learning problem. The two models (i.e., the generator and the discriminator) are trained together. The generator generates a batch of samples, and these, along with real examples from the domain, are provided to the discriminator and classified as real or fake. The discriminator is then updated to get better at discriminating real and fake samples in the next round and, importantly, the generator is updated based on how well (or not) the generated samples fooled the discriminator. In this way, the two models are competing against each other; i.e., they are adversarial in the game theory sense and are playing a zero-sum game.

In this case, "zero-sum" means that when the discriminator successfully identifies real and fake samples, it is rewarded or no change is needed to the model parameters, whereas the generator is penalized with large updates to model parameters. Alternatively, when the generator fools the discriminator, it is rewarded, or no change is needed to the model parameters, but the discriminator is penalized and its model parameters are updated. At a limit, the generator generates perfect replicas from the input domain every time, and the discriminator cannot tell the difference and predicts "unsure" (e.g., 50% for real and fake) in every case.

GANs typically work with image data and use convolutional neural networks (CNNs) as the generator and discriminator models. Modeling image data means that the latent space (i.e., the input to the generator) provides a compressed representation of the set of images or photographs used to train the model. It also means that the generator generates new images, providing an output that can be easily viewed and assessed by developers or users of the model.

GANs have numerous advantages over other types of neural networks and machine learning architectures. For example, a number of common neural networks can be easily fooled into misclassifying items by adding only a small amount of noise into the original data. It has been found that the model, after adding the noise, has higher confidence in the wrong prediction than when predicted correctly. Most common machine learning models learn from a limited amount of data, resulting in overfitting, which can lead to the misclassification discussed above. GANs inherently learn from a large amount of data due to the continuous "zero-sum game" played between the generator and discriminator, thus eliminating the problem of limited training data. Further, in conventional neural networks, the mapping between the input and the output is almost linear. The boundaries of separation between the various classes are not linear but, rather, they are composed of linearities. Thus, even a small change in a point in the feature space might lead to the misclassification of data. GANs do not use a linear mapping, thus avoiding this problem.

The detection of malware using machine learning is known, however, typical detection architectures make use of the type of conventional neural networks discussed above, which are highly susceptible to misclassifications. It would be desirable to be able to apply GANs to the problem of malware identification and detection.

Typical malware detection architectures are either applied to individual devices or are applied across a computer network without consideration for user privacy among the various users of the network. As discussed above, it would be desirable to be able to apply GANs to the problem of malware identification and detection, but it would also be desirable to be able to integrate such a malware identification and detection system into a network which has a second tier or layer of security, specifically in the form of individual user privacy.

Federated learning (also known as "collaborative learning") is a machine learning technique that trains an algorithm via multiple independent sessions, each using its own dataset. This approach stands in contrast to traditional centralized machine learning techniques where local datasets are merged into one training session, as well as to approaches that assume that local data samples are identically distributed. Federated learning enables multiple actors to build a common, robust machine learning model without sharing data, thus addressing critical issues such as data privacy, data security, data access rights and access to heterogeneous data.

Federated learning aims at training a machine learning algorithm on multiple local datasets contained in local nodes without explicitly exchanging data samples. The general principle consists of training local models on local data samples and exchanging parameters (e.g., the weights and biases of a deep neural network) between these local nodes at some frequency to generate a global model shared by all nodes.

Conventional distributed learning aims at parallelizing computing power, whereas federated learning aims at training on heterogeneous datasets. While distributed learning also aims at training a single model on multiple servers, a common underlying assumption is that the local datasets are independent and identically distributed and roughly have the same size. None of these hypotheses are made for federated learning. Rather, the datasets are typically heterogeneous and their sizes may span several orders of magnitude.

To ensure good task performance of a final, central machine learning model, federated learning relies on an iterative process broken up into an atomic set of client-server interactions known as a federated learning round. Each round of this process consists in transmitting the current global model state to participating nodes, training local models on these local nodes to produce a set of potential model updates at each node, and then aggregating and processing these local updates into a single global update and applying it to the global model.

It would be desirable to be able to be able to couple the privacy of federated learning with the advantages discussed above of a GAN-based malware detection system. Thus, a two-tier cybersecurity method solving the aforementioned problems is desired.

SUMMARY OF THE INVENTION

The two-tier cybersecurity method applies malware detection to a network. The malware detection is based on a generative adversarial network (GAN). Additionally, each user accesses the network through a privacy-preserving interface which applies a federated learning-based data-sharing model. Known malware and known benign files are converted into corresponding images, and these corresponding images are used as input sample data for the generative adversarial network for generating a class vector for classifying and identifying malware. The generative adversarial network may be any suitable type of generative adversarial network, such as the convolutional neural network-based GAN discussed above. A malware detector, which may be any suitable type of malware detecting application or program, as is well-known in the art, uses the class vector output by the GAN for malware identification. The malware detector scans the network in a conventional manner.

Additionally, a privacy-preserving interface is established for each user of the network. The privacy-preserving interface is a federated learning-based data-sharing model. In the federated learning-based data-sharing model, the network is considered a class and each user is considered an object. During training, the model receives the individual user behavioral data as objects. The iterative training process supports the model to identify users and their data using the respective objects. The model also encrypts the objects and stores them in a centralized repository database, thus unauthorized users cannot access a particular user's data.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
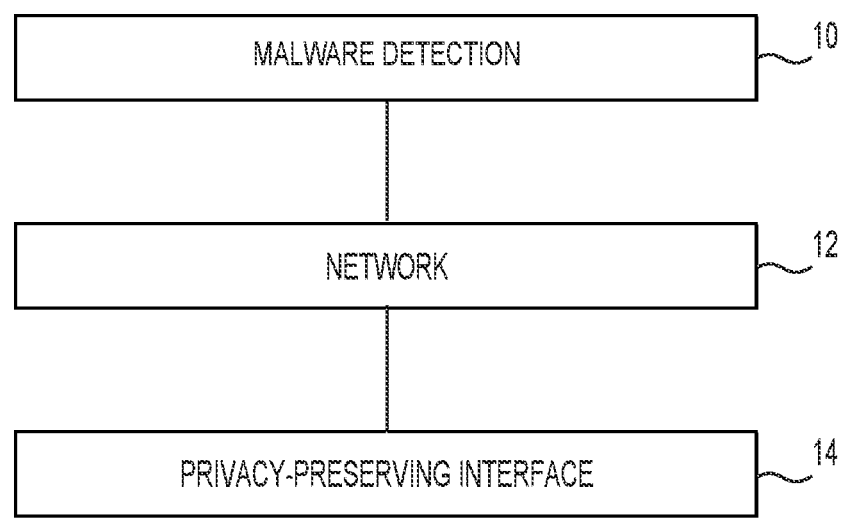
FIG. 1 is a block diagram illustrating the layers of a two-tier cybersecurity method applied to a network.

With reference to FIG. 1, the two-tier cybersecurity method applies malware detection 10 to a network 12. It should be understood that the network 12 may be any suitable type of network, non-limiting examples of such a network include a local area network (LAN), a wide area network (WAN), a mobile network, or the like. The malware detection 10 is based on a generative adversarial network (GAN). Additionally, each user accesses the network through a privacy-preserving interface 14 which applies a federated learning-based data-sharing model.

Figure 2:
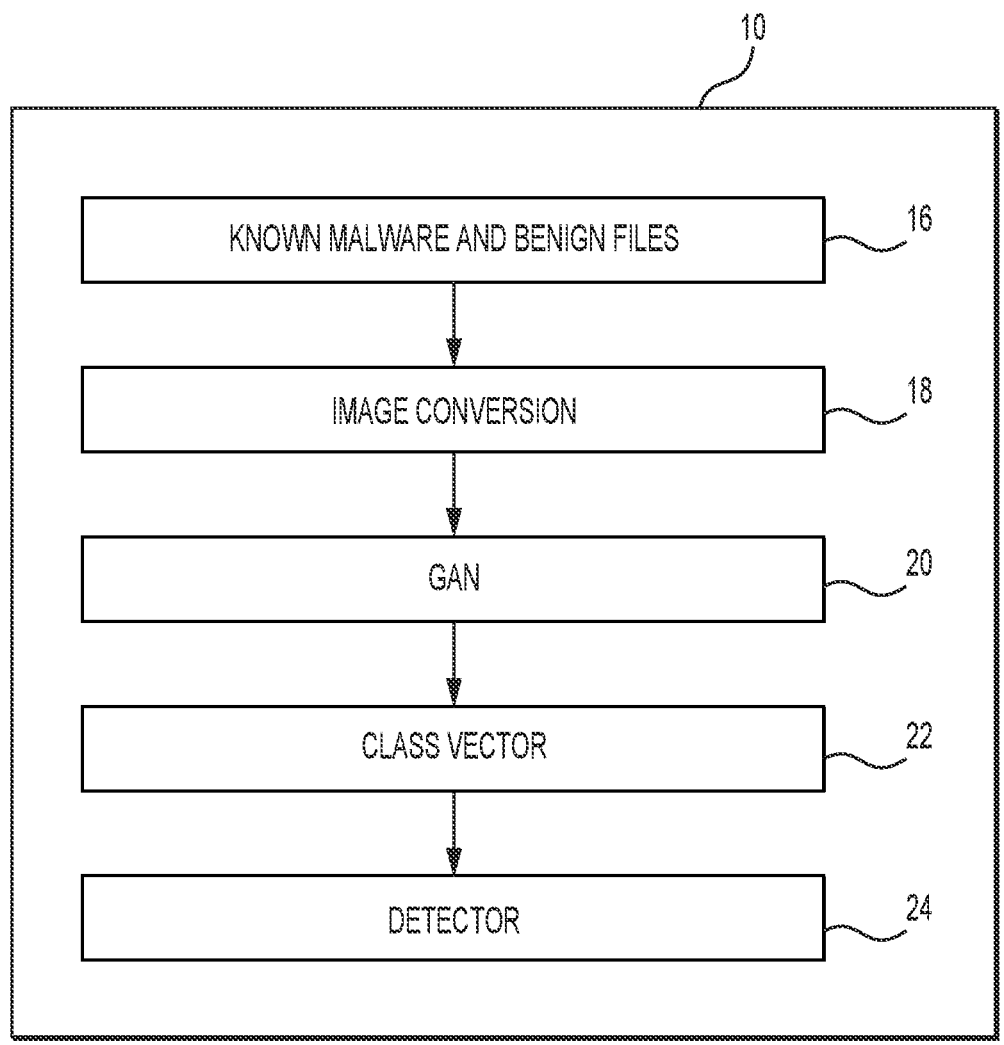
FIG. 2 is a flow diagram showing malware detection steps used by the two-tier cybersecurity method.

As shown in FIG. 2, known malicious and known benign files are used as an initial training set (indicated as 16 in FIG. 2). The known malicious and known benign files are converted into corresponding images (indicated as 18), and these corresponding images are used as input sample data for the generative adversarial network 20 for generating a class vector 22 for classifying and identifying malware. It should be understood that any suitable type of image binary-to-image or data-to-image conversion may be used. Further, it should be understood that the generative adversarial network may be any suitable type of generative adversarial network, such as the convolutional neural network-based GAN discussed above. Examples of GANs, both with and without additional image-conversion, are shown in U.S. Pat. No. 11,297,084 B2; U.S. Pat. No. 10,713,821 B1; and U.S. Pat. No. 10,540,578 B2; and U.S. Patent Publication Nos. US 2022/0269904 A1; and US 2021/0303927 A1, each of which is hereby incorporated by reference.

A malware detector 24, which may be any suitable type of malware detecting application or program, as is well-known in the art, uses the class vector 22 output by the GAN 20 for malware identification. The malware detector 24 scans the network 12 in a conventional manner, as is well-known in the art.

Additionally, a privacy-preserving interface 14 is established for each user of the network 12. The privacy-preserving interface 14 is a federated learning-based data-sharing model. In the federated learning-based data-sharing model, the network 12 is considered a class and each user is considered an object. During training, the model receives the individual user behavioral data as objects. The iterative training process supports the model to identify users and their data using the respective objects. The model also encrypts the objects and stores them in a centralized repository database, thus unauthorized users cannot access a particular user's data.

It should be understood that any federated learning-based approach to data sharing across the network which maintains user privacy may be used. Such methods are well-known in the art, and examples of such methods are disclosed in U.S. Pat. No. 11,663,364 B2; U.S. Pat. No. 11,588,621 B2; and U.S. Pat. No. 11,487,969 B2; and U.S. Patent Publication Nos. US 2023/0153461 A1; US 2023/0056706 A1; US 2023/0153461 A1; US 2022/0335275 A1; and US 2022/0171873 A1, each of which is hereby incorporated by reference.

It is to be understood that the two-tier cybersecurity method is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A two-tiered cybersecurity method, comprising the steps of:
- converting known malicious and known benign files into corresponding images;
- using the corresponding images as input sample data input into a fast-region generative adversarial network and generating a one-dimensional class vector, wherein the one-dimensional class vector classifies and identifies malware;
- scanning a network with a malware detector, wherein the malware detector uses the one-dimensional class vector for malware identification; and
- establishing a privacy-preserving interface for each user of the network, the privacy-preserving interfaced using a federated learning-based data-sharing model, wherein the network is considered a class and each user is considered an object in the federated learning-based data-sharing model.

* * * * *